United States Patent
Hashimoto

(10) Patent No.: US 11,661,068 B2
(45) Date of Patent: *May 30, 2023

(54) VEHICLE SYSTEM FOR RECOGNIZING OBJECTS

(71) Applicant: Toyota Jidosha Kabushiki Kaisha, Toyota (JP)

(72) Inventor: Daisuke Hashimoto, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 49 days.

This patent is subject to a terminal disclaimer.

(21) Appl. No.: 17/351,632

(22) Filed: Jun. 18, 2021

(65) Prior Publication Data

US 2021/0309229 A1 Oct. 7, 2021

Related U.S. Application Data

(63) Continuation of application No. 15/952,677, filed on Apr. 13, 2018, now Pat. No. 11,040,719.

(30) Foreign Application Priority Data

May 24, 2017 (JP) .............................. JP2017-102634

(51) Int. Cl.
 *B60W 40/04* (2006.01)
 *B60W 10/04* (2006.01)
 (Continued)

(52) U.S. Cl.
 CPC ............ *B60W 40/04* (2013.01); *B60W 10/04* (2013.01); *B60W 10/20* (2013.01);
 (Continued)

(58) Field of Classification Search
 CPC ...... B60W 40/04; B60W 10/04; B60W 10/20; B60W 30/0956; B60W 50/0097;
 (Continued)

(56) References Cited

U.S. PATENT DOCUMENTS 5,586,033 A * 12/1996 Hall ..................... A01D 41/127
 706/904
5,712,782 A * 1/1998 Weigelt .............. G05B 19/4183
 701/25

(Continued)

FOREIGN PATENT DOCUMENTS

| JP | 2002-366587 A | 12/2002 |
| JP | 2016-522508 A | 7/2016 |

OTHER PUBLICATIONS

U.S. Appl. No. 15/952,677, filed Apr. 13, 2018, Daisuke Hashimoto.

*Primary Examiner* — Richard A Goldman
(74) *Attorney, Agent, or Firm* — Dinsmore & Shohl LLP

(57) ABSTRACT

A vehicle system includes an electronic control unit. The electronic control unit is configured to execute a first program, a second program, and a third program. The first program is configured to recognize an object present around a vehicle, the second program is configured to store information related to the recognized object as time-series map data, and the third program is configured to predict a future position of the object based on the stored time-series map data. The first program and the third program are configured to be (i) first, individually optimized based on first training data corresponding to output of the first program and second training data corresponding to output of the third program, and (ii) then, collectively optimized based on the second training data corresponding to the output of the third program.

18 Claims, 12 Drawing Sheets

(51) Int. Cl.
*B60W 10/20* (2006.01)
*B60W 50/00* (2006.01)
*G05D 1/02* (2020.01)
*B60W 30/095* (2012.01)
*G06N 3/08* (2023.01)
*G05D 1/00* (2006.01)
*G06N 3/044* (2023.01)
*G06N 7/01* (2023.01)
*B60W 10/06* (2006.01)
*B60W 10/08* (2006.01)

(52) U.S. Cl.
CPC .... *B60W 30/0956* (2013.01); *B60W 50/0097* (2013.01); *G05D 1/0088* (2013.01); *G05D 1/0212* (2013.01); *G05D 1/0214* (2013.01); *G05D 1/0223* (2013.01); *G05D 1/0246* (2013.01); *G05D 1/0257* (2013.01); *G06N 3/044* (2023.01); *G06N 3/08* (2013.01); *G06N 7/01* (2023.01); *B60W 10/06* (2013.01); *B60W 10/08* (2013.01); *B60W 2050/0002* (2013.01); *B60W 2400/00* (2013.01); *B60W 2420/42* (2013.01); *B60W 2420/52* (2013.01); *B60W 2556/00* (2020.02); *B60W 2710/0666* (2013.01); *B60W 2710/20* (2013.01); *B60W 2754/10* (2020.02); *G05D 2201/0213* (2013.01)

(58) Field of Classification Search
CPC ......... B60W 2754/10; B60W 2556/00; B60W 10/06; B60W 10/08; B60W 2050/0002; B60W 2400/00; B60W 2421/42; B60W 2421/52; B60W 2710/0666; B60W 2710/20; B60W 2554/00; B60W 2554/20; B60W 2554/40; B60W 2554/60; B60W 2554/80; G05D 1/0088; G05D 1/0212; G05D 1/0214; G05D 1/0223; G05D 1/0246; G05D 1/0257; G05D 2201/0213; G06N 3/0445; G06N 3/08; G06N 7/005; G06N 20/00; G06N 3/02; G06N 3/10
USPC ....... 701/23, 25, 117; 706/12, 16, 20, 21, 41
See application file for complete search history.

(56) References Cited

U.S. PATENT DOCUMENTS

| | | | | |
|---|---|---|---|---|
| 6,167,332 A * | 12/2000 | Kurtzberg | ............ | G05D 1/0274 701/411 |
| 7,539,624 B2 * | 5/2009 | Matheson | ........ | G06Q 10/06314 701/19 |
| 7,788,199 B2 * | 8/2010 | Moses | ............... | G06Q 10/10 706/45 |
| 8,260,485 B1 * | 9/2012 | Meuth | ............... | G06Q 10/04 701/26 |
| 9,015,083 B1 * | 4/2015 | Monga | ............... | G06F 17/10 706/12 |
| 10,270,642 B2 * | 4/2019 | Zhang | ............... | G01S 13/00 |
| 10,354,150 B2 * | 7/2019 | Yamazaki | ............ | G06T 7/593 |
| 11,040,719 B2 * | 6/2021 | Hashimoto | ........... | B60W 10/04 |
| 2004/0093245 A1 * | 5/2004 | Matheson | ........ | G06Q 10/06375 701/19 |
| 2005/0004719 A1 * | 1/2005 | Dickmann | ............ | G01S 13/931 701/1 |
| 2005/0027402 A1 * | 2/2005 | Koibuchi | ........... | B60W 30/1819 701/1 |
| 2008/0119994 A1 * | 5/2008 | Kameyama | ............ | B60W 40/08 701/1 |
| 2008/0170123 A1 * | 7/2008 | Albertson | ................ | G06T 7/20 348/157 |
| 2008/0262810 A1 * | 10/2008 | Moran | ..................... | E21B 7/00 703/10 |
| 2009/0105935 A1 * | 4/2009 | Jha | ........................ | G08G 5/0034 701/120 |
| 2009/0306894 A1 * | 12/2009 | Noble | .............. | G06Q 10/08355 705/338 |
| 2010/0045448 A1 * | 2/2010 | Kakinami | ............ | G06V 20/586 382/154 |
| 2012/0053755 A1 * | 3/2012 | Takagi | .................. | G01S 7/4808 701/1 |
| 2013/0226318 A1 * | 8/2013 | Procyk | .................. | G06Q 10/06 700/33 |
| 2013/0304374 A1 * | 11/2013 | Lee | ...................... | G01S 19/485 701/445 |
| 2015/0266455 A1 * | 9/2015 | Wilson | ................... | G09B 19/10 701/93 |
| 2015/0284010 A1 * | 10/2015 | Beardsley | ........ | G08G 1/096816 701/1 |
| 2016/0116916 A1 | 4/2016 | Pink et al. | | |
| 2016/0125673 A1 * | 5/2016 | Bromham | ............. | G01C 21/26 701/115 |
| 2017/0097237 A1 * | 4/2017 | Wang | ................... | G01C 21/206 |
| 2017/0103571 A1 * | 4/2017 | Beaurepaire | ........... | G06F 3/011 |
| 2017/0120926 A1 * | 5/2017 | Yoon | ......................... | G06N 7/01 |
| 2017/0193338 A1 * | 7/2017 | Huberman | ............. | G06V 10/82 |
| 2018/0046896 A1 * | 2/2018 | Yu | ........................... | G06N 3/045 |
| 2018/0183650 A1 * | 6/2018 | Zhang | .................... | G01S 13/00 |
| 2018/0217614 A1 * | 8/2018 | Salas-Moreno | ...... | G01C 21/383 |
| 2018/0275663 A1 * | 9/2018 | Sonoura | ............... | G05D 1/0088 |
| 2018/0300641 A1 * | 10/2018 | Dong | ................ | G01C 21/3484 |
| 2018/0306587 A1 * | 10/2018 | Holz | ................... | G01C 21/206 |
| 2018/0307941 A1 * | 10/2018 | Holz | ....................... | B66F 9/063 |
| 2018/0339710 A1 * | 11/2018 | Hashimoto | ........ | B60W 30/0956 |
| 2018/0342034 A1 * | 11/2018 | Kislovskiy | ......... | G06Q 10/06315 |
| 2018/0342113 A1 * | 11/2018 | Kislovskiy | ............. | G07C 5/008 |
| 2018/0364045 A1 * | 12/2018 | Williams | ................ | G01S 17/88 |
| 2019/0155290 A1 * | 5/2019 | Luo | ........................ | G05D 1/0214 |
| 2019/0186940 A1 * | 6/2019 | Hwang | ................. | B62D 15/0265 |
| 2020/0005647 A1 * | 1/2020 | Tsurumi | ................. | G09B 29/10 |
| 2020/0007249 A1 * | 1/2020 | Derr | ........................ | G06N 3/045 |
| 2020/0047337 A1 * | 2/2020 | Williams | ................ | B25J 9/163 |
| 2020/0047343 A1 * | 2/2020 | Bal | ........................ | G05D 1/0219 |

* cited by examiner

| HABIT CATEGORY | PROBABILITY |
|---|---|
| ORDINARY | 0.019 |
| VEHICLE OF SKILLED DRIVER | 0.010 |
| VEHICLE OF BEGINNER DRIVER | 0.020 |
| VEHICLE OF IMPATIENT DRIVER | 0.650 |
| AUTONOMOUS VEHICLE | 0.001 |
| VEHICLE OF AGGRESSIVE DRIVER | 0.200 |
| VEHICLE OF DRUNK DRIVER | 0.100 |
| EMERGENCY VEHICLE | 0.000 |

VEHICLE SYSTEM FOR RECOGNIZING OBJECTS

CROSS-REFERENCE TO RELATED APPLICATIONS

This application is a continuation application of co-pending U.S. patent application Ser. No. 15/952,677, filed Apr. 13, 2018, for "Vehicle Systems For Recognizing Objects," which claims priority to Japanese Patent Application No. 2017-102634 filed on May 24, 2017, which are incorporated herein by reference in their entirety including the specification, drawings, and abstract.

BACKGROUND

1. Technical Field

The present disclosure relates to a vehicle system that predicts the motion of an object present around a vehicle.

2. Description of Related Art

A technology referred to as occupancy grid map (OGM) that represents a map showing a vehicle and its surrounding area on regions divided into a grid shape is known (refer to Japanese Unexamined Patent Application Publication (Translation of PCT Application) No. 2016-522508 (JP 2016-522508 A)). A technology that considers individual optimization and global optimization in an optimization problem having a plurality of evaluation functions is disclosed (refer to Japanese Unexamined Patent Application Publication No. 2002-366587 (JP 2002-366587 A)).

SUMMARY

For example, occupancy grid map (OGM) may be used for predicting a future position of an object (another vehicle, a pedestrian, or the like) present around a vehicle. However, when the number of objects present around the vehicle or the number of their types is increased, a technical problem arises in that a calculation load for the prediction is increased. An increase in calculation load is considered to be reduced by machine learning, but a sufficient effect may not be achieved without an appropriate learning model.

The present disclosure provides a vehicle system that can suitably predict a future position of an object present around a vehicle.

An aspect of the present disclosure relates to a vehicle system including an electronic control unit. The electronic control unit configured to execute a first program, a second program, and a third program. The first program is configured to recognize an object present around a vehicle, a second program is configured to store information related to the object recognized by the first program as time-series map data, and a third program is configured to predict a future position of the object based on the time-series map data stored by the second program. The first program and the third program are configured to be (i) first, individually optimized based on first training data corresponding to output of the first program and second training data corresponding to output of the third program, and (ii) then, collectively optimized based on the second training data corresponding to the output of the third program.

When programs are individually optimized (that is, individual optimization), optimization specialized for the function of each program can be implemented, but optimization considering the function of a system as a whole cannot be implemented. When a plurality of programs is collectively optimized (that is, global optimization) from the beginning, there is a possibility of a significant increase in processing load needed for optimization. Since the global optimization does not consider the function of each program, a true optimal value (that is, the best value achievable by optimization) may not be achieved, and there is a possibility that the effect of optimization is not sufficiently achieved.

Meanwhile, the vehicle system according to the aspect of the present disclosure first performs the individual optimization of each of the first program and the third program, and then, performs the global optimization. When optimization is performed in such a stepwise manner, the global optimization that has a relatively high processing load is performed in a state where optimization specialized for the function of each program is implemented by the individual optimization having a relatively low processing load. Accordingly, optimization that has a lower processing load and a higher effect than when the global optimization is performed from the beginning can be implemented. Consequently, the future position of the object present around the vehicle can be suitably predicted.

The effects and other advantages of the present disclosure will become more apparent from the embodiment set forth below.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 5 is a plan view illustrating one example of a grid map represented by a probability distribution;

FIG. 8 is a conceptual table illustrating a method of determining a habit category;

DETAILED DESCRIPTION OF EMBODIMENTS

An embodiment according to a vehicle system of the present disclosure will be described based on the drawings.

Configuration of Vehicle

Figure 1:
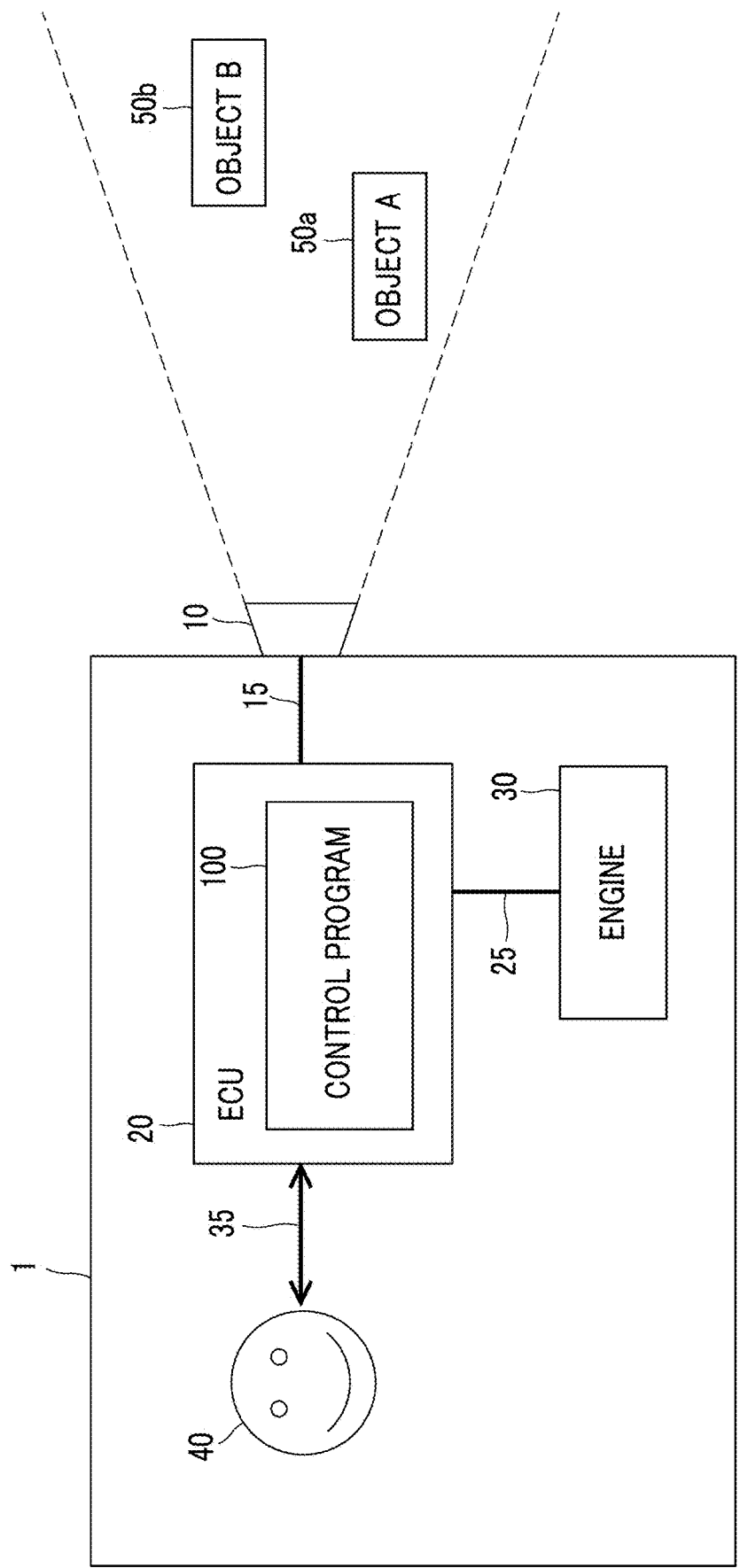
FIG. 1 is a block diagram illustrating a configuration of a vehicle according to an embodiment.

First, a configuration of a vehicle in which a vehicle system according to the embodiment is mounted will be described with reference to FIG. 1. FIG. 1 is a block diagram illustrating a configuration of a vehicle according to the embodiment.

In FIG. 1, a vehicle 1 according to the present embodiment is configured to include a sensor 10, an electrical control unit (ECU) 20, an engine 30, communication interfaces 15, 25, and a user interface 35. The ECU 20 is a specific example of an "electronic control unit".

The sensor 10 is configured to include a vehicle-mounted camera, a radar, Laser Imaging Detection and Ranging (LIDAR), or the like and detects an object (specifically, an object A50a and an object B50b in FIG. 1) that is present around the vehicle 1. The object A 50a and the object B 50b is a specific example of an "object" and is exemplified by another vehicle, a pedestrian, a bicycle, or the like.

The ECU 20 is a control unit including calculation circuits such as a central processing unit (CPU) and a graphics processing unit (GPU), and is configured to control the operation of each unit of the vehicle 1. The detection result of the sensor 10 is input into the ECU 20 through the communication interface 15, and the ECU 20 processes the detection result of the sensor 10 using a control program 100. The control program 100 outputs a control signal generated as a processing result to the engine 30 through the communication interface 25. The control program 100 provides a driver 40 with information related to the processing result through the user interface 35. A specific configuration of the control program 100 will be described in detail below.

The engine 30 is a main power source of the vehicle 1 and outputs a torque by combusting fuel such as gasoline. The torque output by the engine 30 is usually controlled based on an operation of an accelerator pedal performed by the driver 40. When the vehicle 1 is under an autonomous driving control or a semi-autonomous driving control (that is, autonomous driving in which the driver 40 performs at least a part of driving operations), the control program 100 of the ECU 20 controls the output torque of the engine 30. The vehicle 1 may be an electric vehicle having a power source such as a motor instead of the engine 30, or may be a hybrid vehicle having a power source such as a motor in addition to the engine 30. In such a case, the ECU 20 may control the operation of the power source such as a motor in addition to or instead of the engine 30.

Configuration of Control Program

Figure 2:
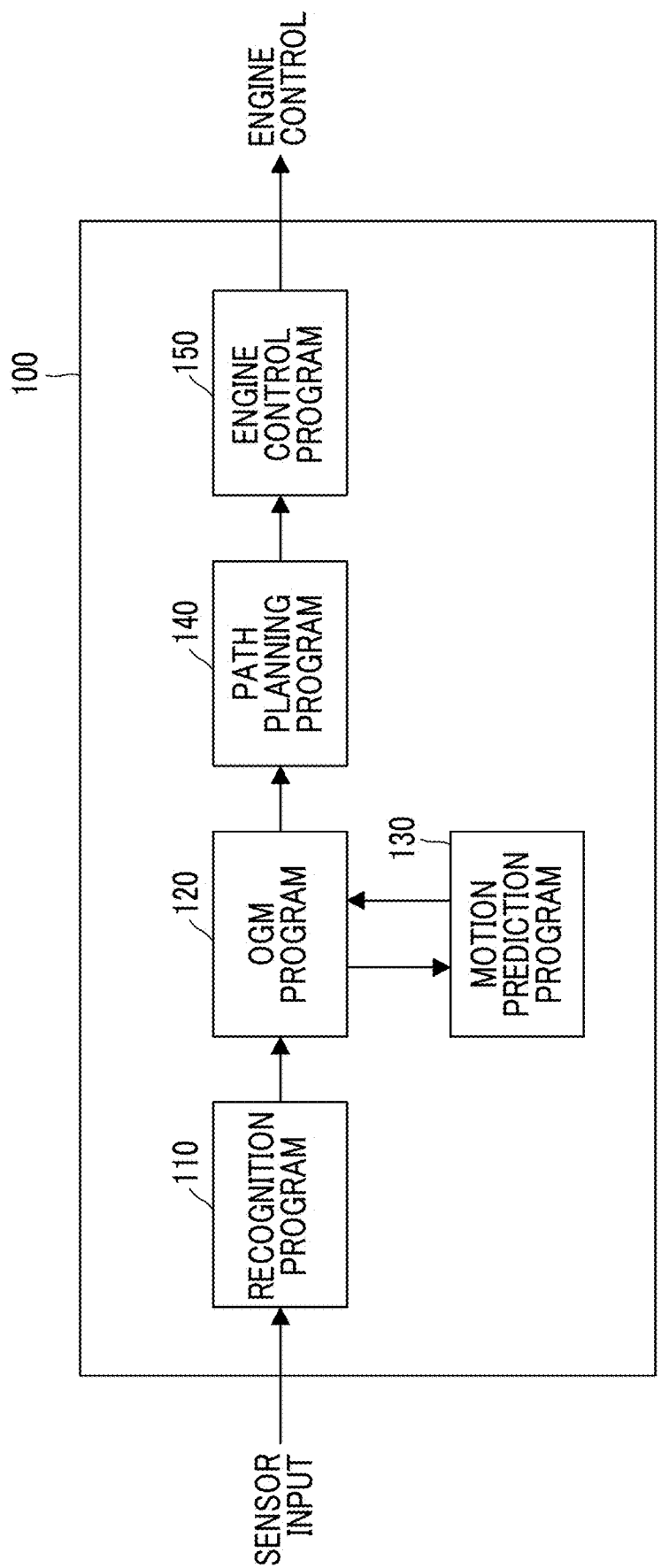
FIG. 2 is a configuration diagram of a control program stored in an ECU.

A configuration of the control program 100 in the ECU 20 will be specifically described with reference to FIG. 2. FIG. 2 is a configuration diagram of the control program stored in the ECU 20.

In FIG. 2, the control program 100 is configured to include a recognition program 110, an OGM program 120, a motion prediction program 130, a path planning program 140, and an engine control program 150.

The recognition program 110 recognizes the object present around the vehicle 1 from sensor input (that is, the detection result of the sensor 10). A specific method for recognizing the object can appropriately employ a well-known technology such as single shot multibox detector (SSD) and multi-scale deep convolutional neural network (MS-CNN) and thus, will not be described in detail here. The recognition program 110 is a specific example of a "first program".

The OGM program 120 generates a two-dimensional grid map representing current position information of the object based on the detection result of the recognition program 110. The OGM program 120 outputs information related to the generated grid map to the motion prediction program 130 and generates a grid map representing future position information of the object based on prediction information input from the motion prediction program 130. The operation of the OGM program 120 will be described in more detail below. The OGM program 120 is a specific example of a "second program".

The motion prediction program 130 predicts a motion (in other words, a future position) of the recognized object based on time-series data (that is, a plurality of grid maps generated at different timings) generated by the OGM program 120. The operation of the motion prediction program 130 will be described in detail below. The motion prediction program 130 is a specific example of a "third program".

The path planning program 140 generates a traveling schedule (for example, a traveling path and a vehicle speed) of the vehicle 1 when the vehicle 1 is under the autonomous driving control or the semi-autonomous driving control. Specifically, the path planning program 140 generates the traveling schedule of the vehicle 1 to avoid collision with or approaching too close to the object based on the position information of the object accumulated until the present time in the OGM program 120 and the future position information of the object. A specific method for generating the traveling schedule of the vehicle 1 can appropriately employ a well-known technology and thus, will not be described in detail here.

The engine control program 150 is a program for controlling the operation of the engine 30 of the vehicle 1 when the vehicle 1 is under the autonomous driving control or the semi-autonomous driving control. The engine control program 150 controls the operation of the engine 30 (in other words, the torque output by the engine) based on the traveling schedule of the vehicle 1 generated by the path planning program 140. A specific method for controlling the engine 30 based on the traveling schedule of the vehicle 1 can appropriately employ a well-known technology and thus, will not be described in detail here. Another program (for example, a steering control program) for performing the autonomous driving control or the semi-autonomous driving control may be included in addition to or instead of the engine control program 150.

Details of OGM Program

Figure 3:
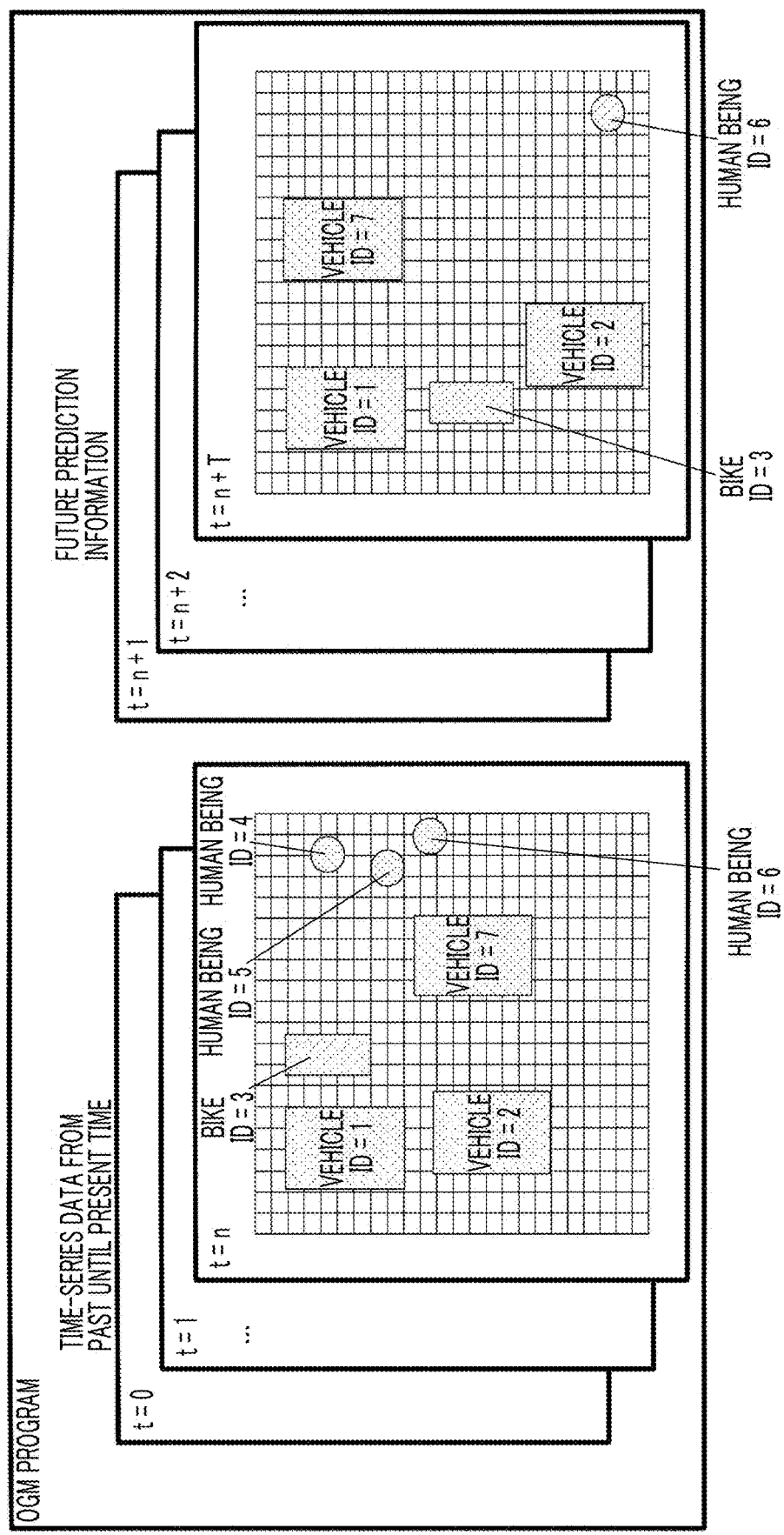
FIG. 3 is a conceptual diagram illustrating one example of a grid map accumulated in an OGM program.
Figure 4:
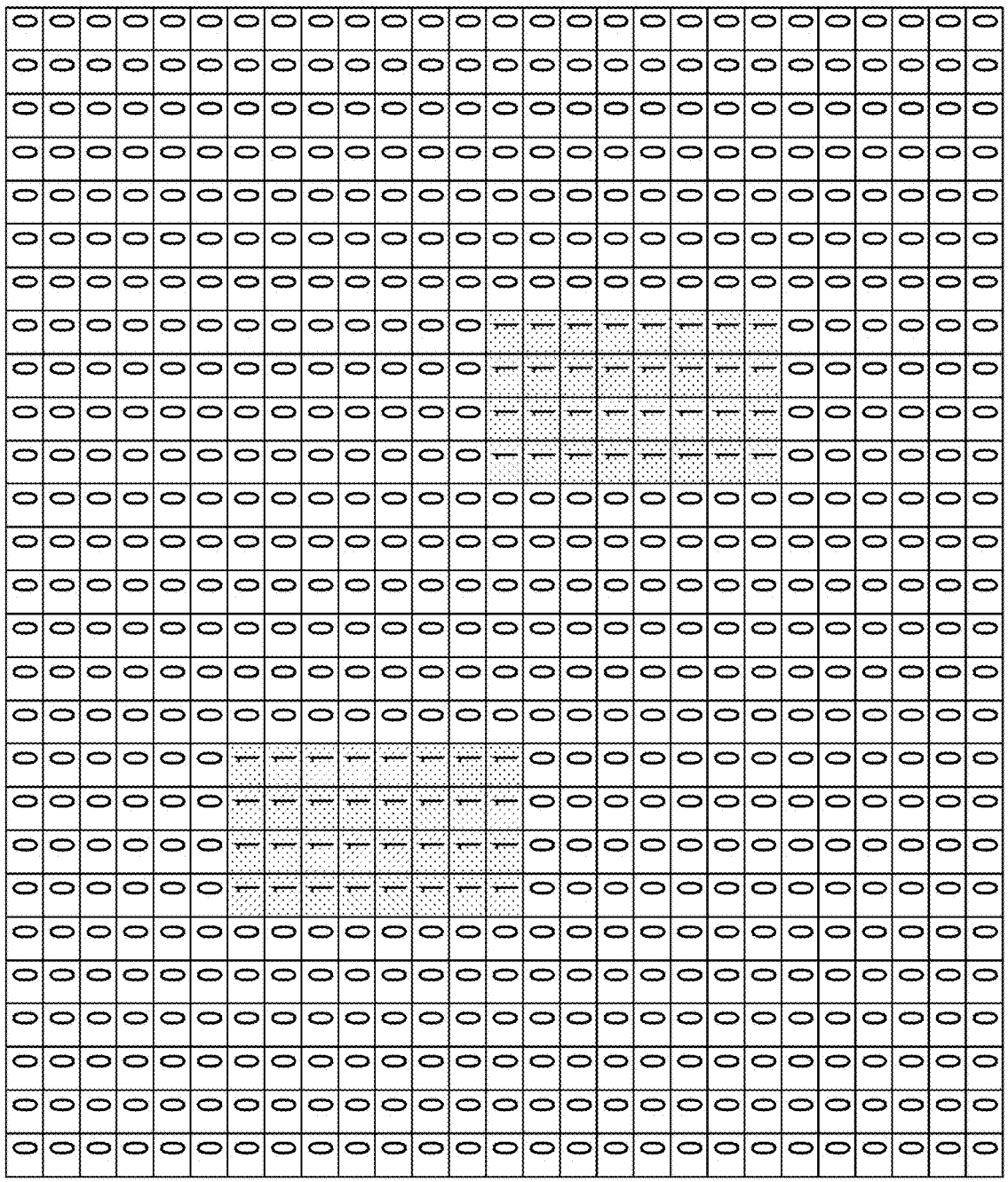
FIG. 4 is a plan view illustrating one example of a grid map represented by discrete values.
Figure 5:
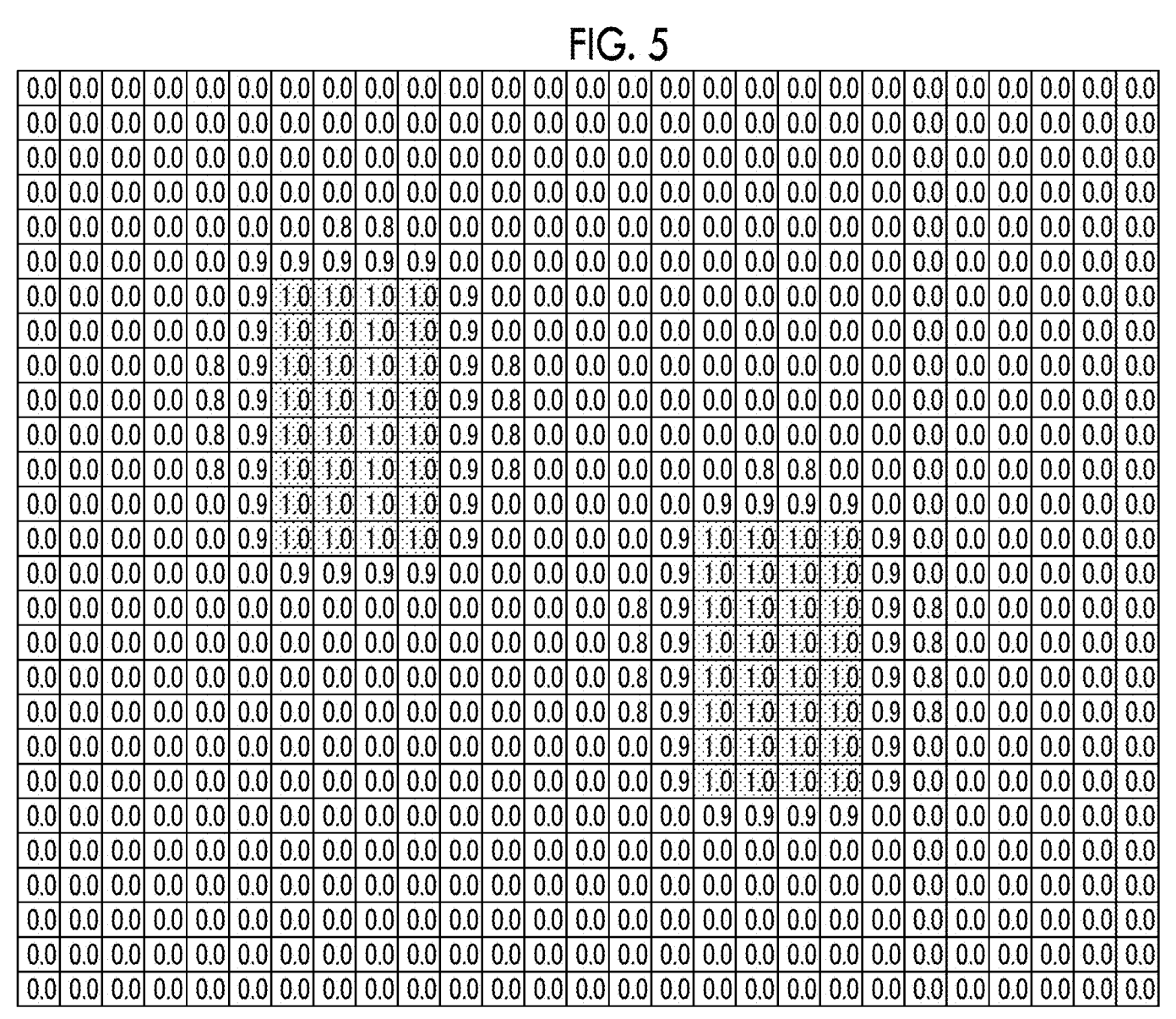

The OGM program 120 will be described in detail with reference to FIG. 3 to FIG. 5. FIG. 3 is a conceptual diagram illustrating one example of a grid map accumulated in the OGM program. FIG. 4 is a plan view illustrating one example of a grid map represented by discrete values. FIG. 5 is a plan view illustrating one example of a grid map represented by a probability distribution.

In FIG. 3, the OGM program 120 generates a two-dimensional grid map per predetermined period based on the recognition result of the recognition program 110. Thus, a plurality of grid maps as time-series data from the start of recognition of the object (t=0) until the present time (t=n) is accumulated in the OGM program 120. Each grid map acquired until the present time includes not only object coordinate information indicating the position of the object but also an object category (for example, a vehicle, a bike, or a human being) indicating the type of the object and an object-specific ID for individually recognizing a plurality of objects. While each grid map in the present embodiment is configured using two-dimensional relative coordinates parallel to the horizontal plane with the position of the vehicle 1 as a reference, each grid map may be configured with three-dimensional coordinates including height information, or may be configured with world coordinates (absolute coordinates) that are generated using information acquired from a global positioning system (GPS) sensor.

The OGM program 120 generates a future grid map based on the prediction information input from the motion prediction program 130. Thus, a plurality of grid maps as time-series data of the future (t=n+1 to n+T) from the present time (t=n) is accumulated in the OGM program 120. Each future grid map includes various information included in the grid maps until the present time and also includes the direction of the object, the speed of the object, and a habit category, described in detail below, of the object that are acquired from the prediction information.

As illustrated in FIG. 4, for example, the OGM program 120 generates a two-dimensional grid map as a bitmap that is represented by discrete values of zero or one. The numerical value of zero or one is the probability of the presence of the object. A part having zero indicates that the object is not present. A part having one indicates that the object is present.

Alternatively, for example, as illustrated in FIG. 5, the OGM program 120 may generate a two-dimensional grid map as a bitmap that is represented by continuous values of 0.0 to 1.0 (more specifically, for example, continuous values at intervals of 0.1). The numerical value of 0.0 to 1.0 is the probability of the presence of the object and indicates that the probability of the presence of the object is increased as the numerical value approaches 1.0 (that is, the numerical value is increased).

Details of Motion Prediction Program

Figure 6:
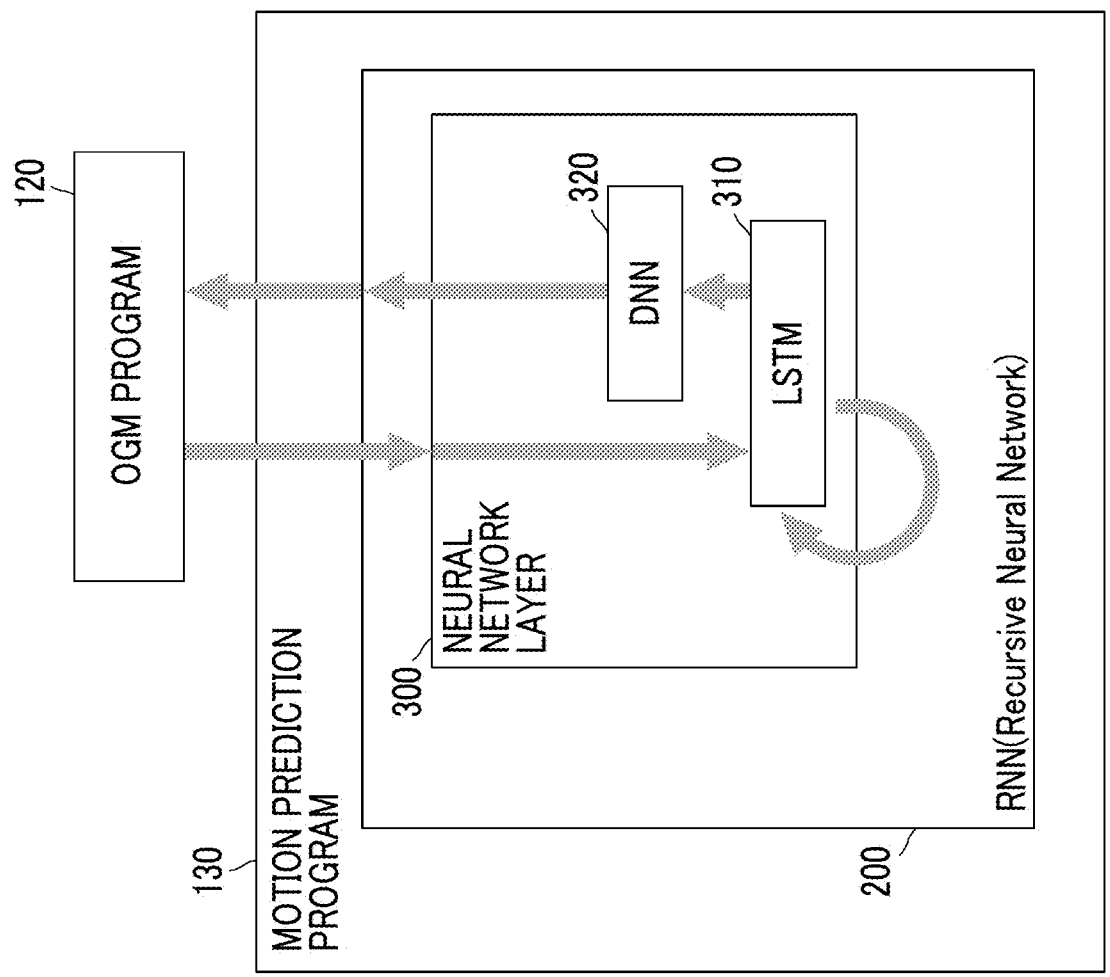
FIG. 6 is a configuration diagram of a motion prediction program.
Figure 7:
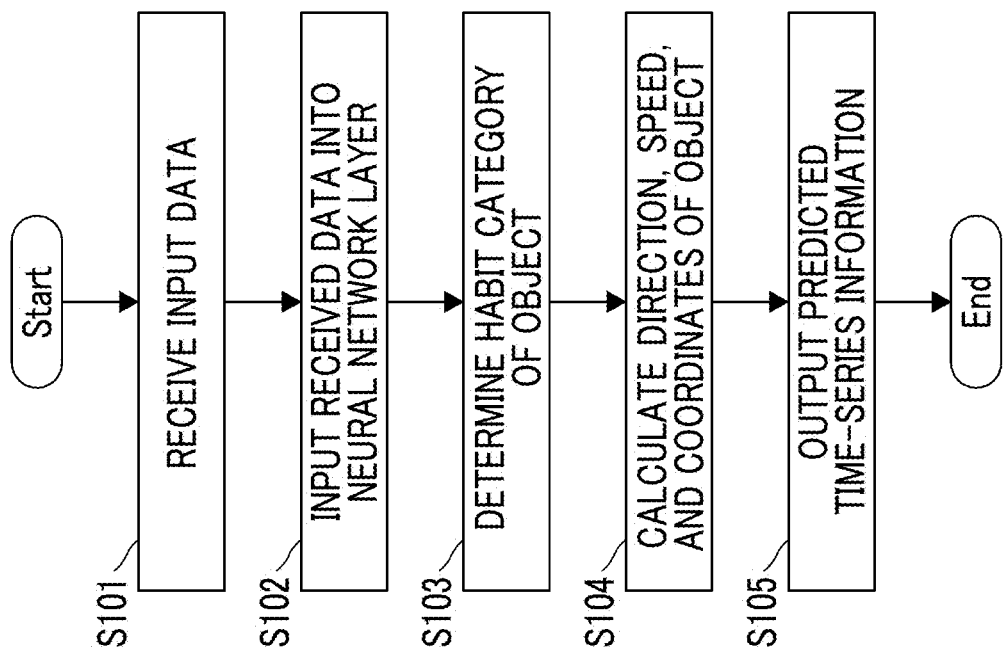
FIG. 7 is a flowchart illustrating a flow of operation of the motion prediction program.
Figure 9:
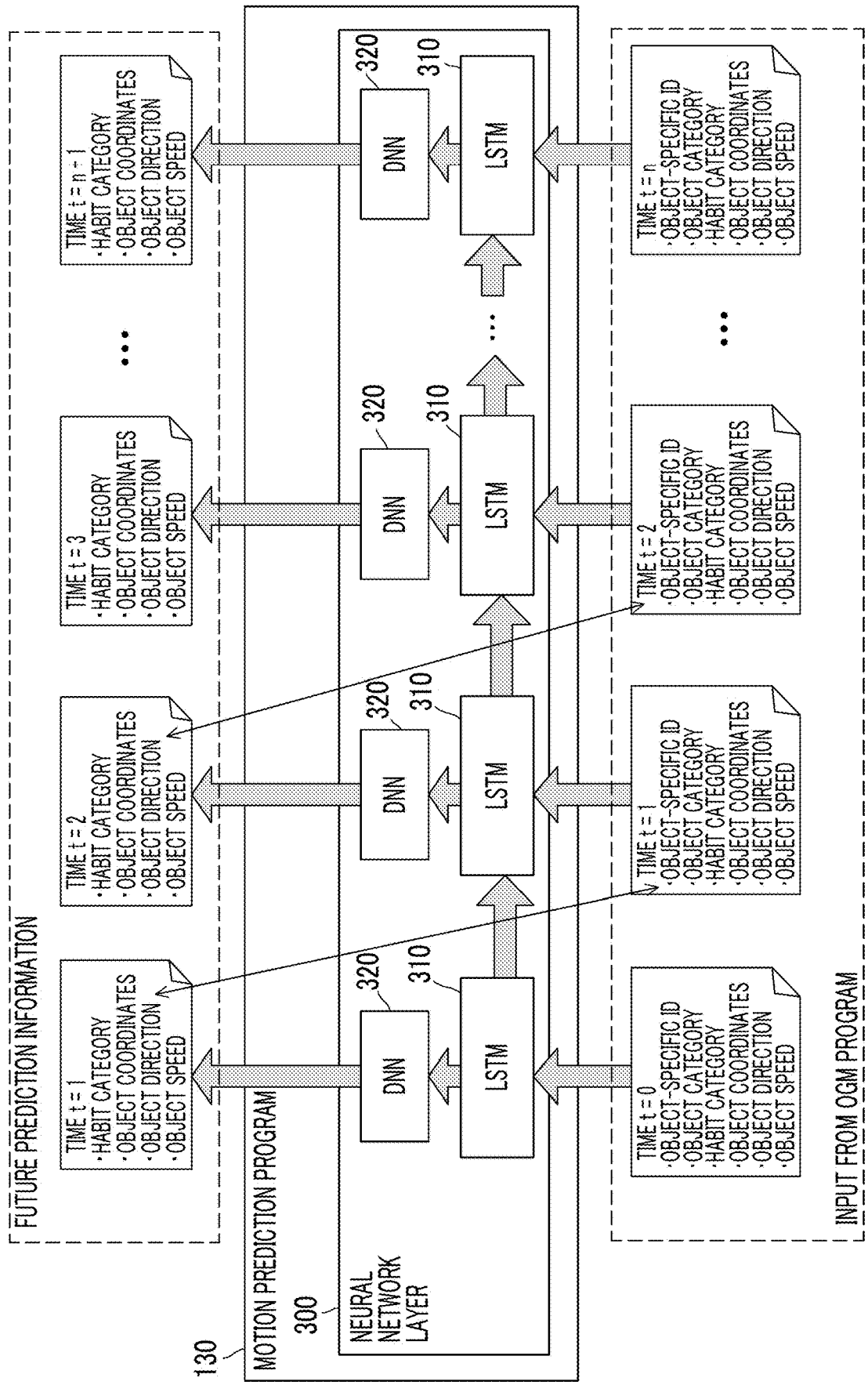
FIG. 9 is a conceptual diagram illustrating input and output of the motion prediction program.

The motion prediction program 130 will be described in detail with reference to FIG. 6 to FIG. 9. FIG. 6 is a configuration diagram of the motion prediction program. FIG. 7 is a flowchart illustrating the flow of operation of the motion prediction program. FIG. 8 is a conceptual table illustrating a method of determining the habit category. FIG. 9 is a conceptual diagram illustrating input and output of the motion prediction program.

In FIG. 6, the motion prediction program 130 includes a recursive neural network (RNN) 200 and predicts the future position of the object by deep learning. The RNN 200 includes a neural network layer 300 that is configured with a long short-term memory (LSTM) 310 and a deep neural network (DNN) 320. Information (time-series data) that is output from the OGM program 120 and input into the motion prediction program 130 is configured to be output back to the OGM program 120 through processes in the LSTM 310 and the DNN 320. Other neural networks for processing time series such as three-dimensional CNN may be used instead of RNN. Hereinafter, the flow of operation of the motion prediction program 130 will be described in detail.

In FIG. 7, first, the motion prediction program 130 receives input data (that is, the grid map representing the current surrounding area information of the vehicle 1) from the OGM program 120 (step S101). The input data from the OGM program 120 may be the data of the grid map or may be data acquired by compressing the grid map data or difference data with respect to the past grid map data. The motion prediction program 130 inputs the received input data into the neural network layer 300 (step S102).

The input data that is input into the neural network layer 300 is processed by deep learning in the LSTM 310 and the DNN 320, and the prediction information that indicates the future position of the object is output from the DNN 320. While the operation of the LSTM 310 and the DNN 320 is a well-known technology and thus, will not be specifically described here, the prediction information output from the DNN 320 according to the present embodiment includes, particularly, a determination parameter for determining the habit category of the object. The habit category is a preset category for categorizing the behavioral habit of the object.

As illustrated in FIG. 8, specific examples of the habit category when the object is another vehicle include "ordinary (that is, general driver)", "skilled driver", "beginner driver", "impatient driver", "autonomous vehicle", "aggressive driver", "vehicle of drunk driver", and "emergency vehicle". For example, when the habit category of the object (vehicle) is determined as "skilled driver", it can be estimated that the object has a high possibility of traveling by selecting an efficient traveling route. When the habit category of the object (vehicle) is determined as "beginner driver", it can be estimated that the object has a possibility of traveling by selecting a traveling route that is not selected by ordinary drivers.

While the habit category corresponds to the object of which the object category is "vehicle", the habit category is set per object category. For example, a habit category such as "child", "student", "adult", "senior", and "drunk person" may be set for an object of which the object category is "human being".

The determination parameter is calculated as a parameter that indicates the probability of the object as a determination target falling into each habit category. In the example illustrated in FIG. 8, the probability of falling into "impatient driver" is "0.650", which is the highest. Thus, the habit category of the object in such a case is determined as "impatient driver".

Returning to FIG. 7, the DNN 320 determines the habit category of the object (step S103). Since the habit category is categorization of the behavioral habit of the object, the behavioral habit of the object can be determined by determining which habit category the object corresponds to. More specifically, the motion that the object has a high possibility of making henceforth (or the motion that the object has a low possibility of making) can be found depending on the habit category into which the object falls.

Then, the DNN 320 calculates the direction, the speed, and the coordinates of the object based on the input data and the determined habit category (that is, information indicating the behavioral habit of the object) (step S104). The direction, the speed, and the coordinates of the object can also be calculated from the time-series data without using the habit category. However, when the habit category into which the behavioral habit of the object is categorized is used, the calculated value can be more accurate than when merely the time-series data is used. Lastly, the motion prediction program 130 outputs the predicted habit category, the direction, the speed, and the coordinates of the object to the OGM program 120 as the prediction information (step S105).

As illustrated in FIG. 9, the motion prediction program 130 outputs the future prediction information each time the OGM program 120 generates a two-dimensional grid map (that is, continuously per predetermined period). At such a time, the input data that is input from the OGM program is not the grid map generated by the OGM program 120, and is the grid map generated based on the prediction information that has already been acquired from the motion prediction program 130 (in other words, the grid map that is acquired by updating the grid map generated by the OGM program 120 based on the prediction information). Thus, the input data from the OGM program 120 also includes "habit category", "object coordinates", "object direction", and "object speed" that are not easily estimated from the recognition result of the recognition program 110. A preset initial value may be used for each of "habit category", "object coordinates", "object direction", and "object speed" in the input data in a state where the prediction information is not acquired yet.

As described thus far, the grid map that is generated based on the prediction information includes information that is not included in the grid map generated from the recognition result. Thus, when prediction continues using the grid map that is updated based on the prediction information, the future position of the object can be more accurately predicted than when prediction is performed using merely the grid map generated from the recognition result of the recognition program 110.

Program Optimization

Figure 10:
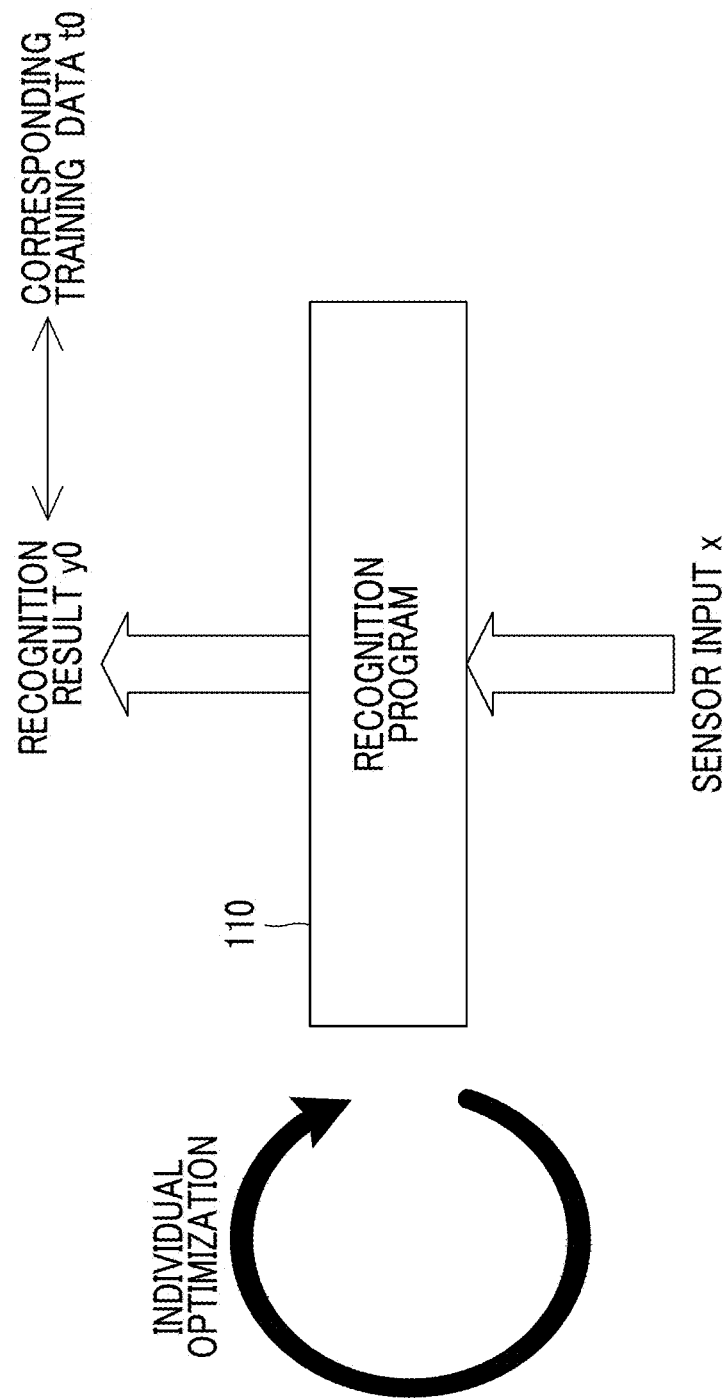
FIG. 10 is a conceptual diagram illustrating individual optimization of a recognition program.
Figure 11:
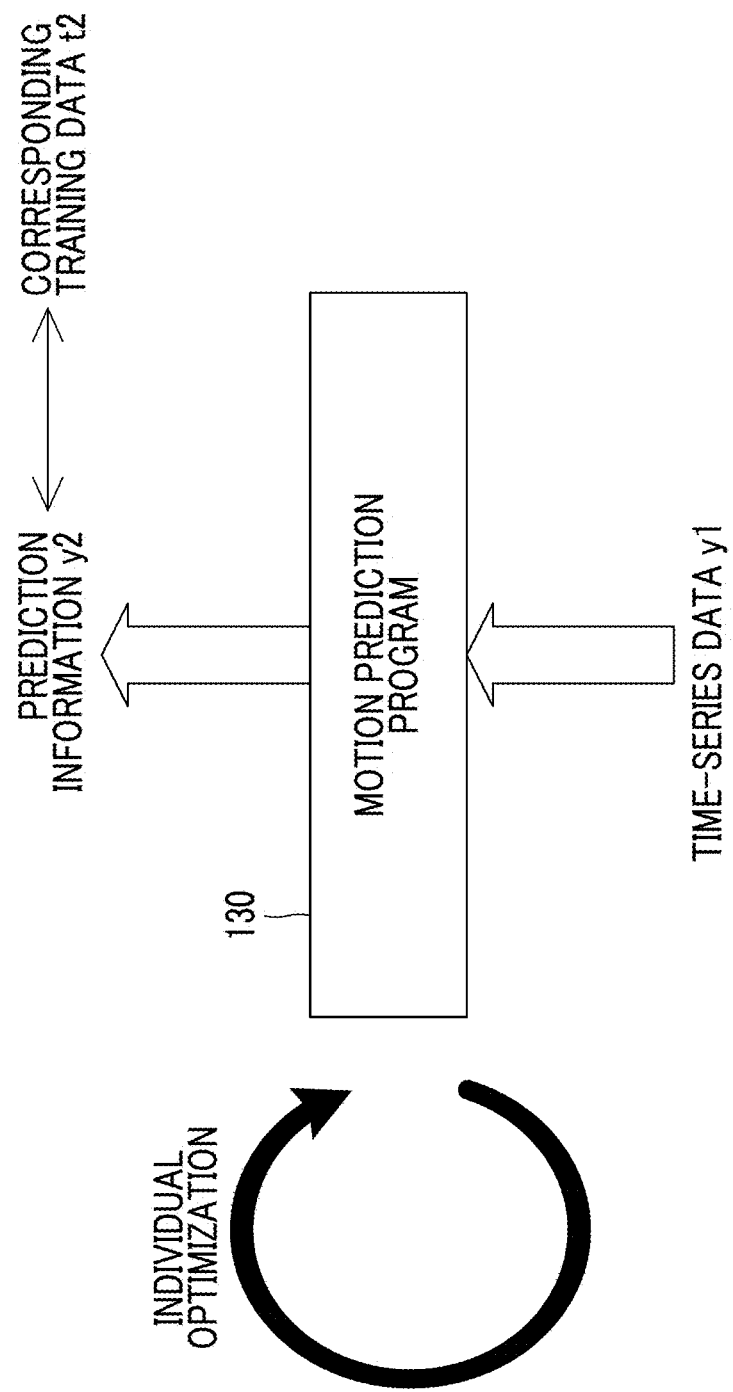
FIG. 11 is a conceptual diagram illustrating individual optimization of the motion prediction program.
Figure 12:
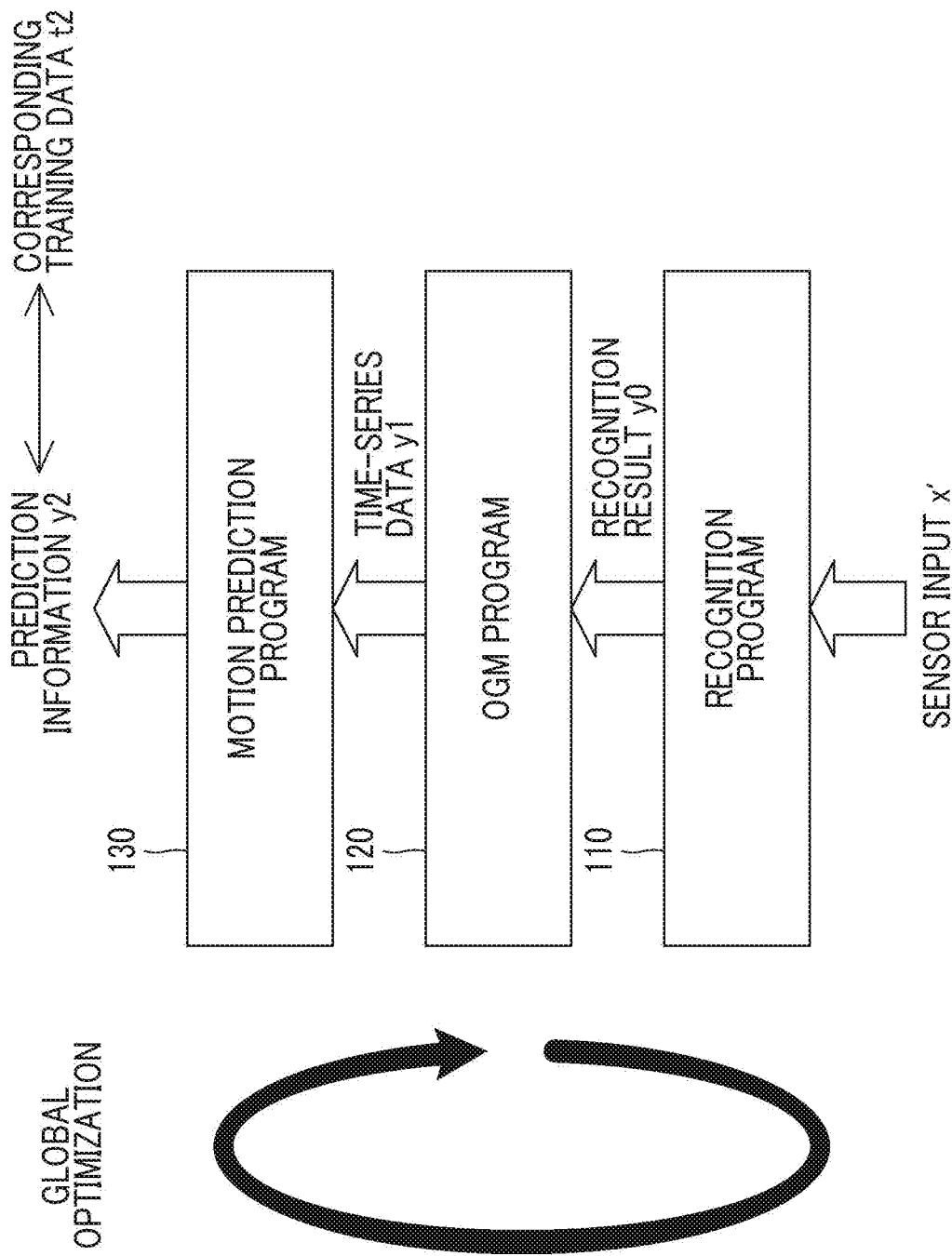
FIG. 12 is a conceptual diagram illustrating global optimization of three programs.

Optimization of the recognition program 110, the OGM program 120, and the motion prediction program 130 (that is, learning for making the output of each program more appropriate) will be described with reference to FIG. 10 to FIG. 12. FIG. 10 is a conceptual diagram illustrating individual optimization of the recognition program 110. FIG. 11 is a conceptual diagram illustrating individual optimization of the motion prediction program 130. FIG. 12 is a conceptual diagram illustrating global optimization of three programs. Optimization described below is assumed to be performed before the vehicle system becomes available on the market.

As illustrated in FIG. 10 and FIG. 11, in the present embodiment, first, individual optimization of each of the recognition program 110 and the motion prediction program 130 is executed. The individual optimization of the recognition program 110 is performed by comparing a recognition result y0 with training data t0 corresponding to the recognition result y0. The recognition result y0 is the output of the recognition program 110 for sensor input x. The training data t0 is a specific example of "first training data". Specifically, a learning parameter of the recognition program 110 is optimized to approximate the recognition result y0 to the training data t0. The individual optimization of the motion prediction program 130 is performed by comparing prediction information y2 with training data t2 corresponding to the prediction information y2. The prediction information y2 is the output of the motion prediction program 130 for time-series data y1 (that is, the input data from the OGM program 120). The training data t2 is a specific example of "second training data". Specifically, a learning parameter of the motion prediction program 130 is optimized to approximate the prediction information y2 to the training data t2.

For example, the learning parameter may be optimized by finding a learning parameter that minimizes the value of an error function in a machine learning model. Stochastic gradient descent (SGD), adaptive moment estimation (Adam), and the like can be used as a specific method. Such a method is a well-known technology and thus, will not be described in detail here. Other well-known technologies can also be employed instead of such an optimization method.

Simulation may be performed under a preset condition in order to acquire training data used in optimization. Specifically, when a simulation in which the driver of which the habit category is determined (for example, a beginner driver or a skilled driver in actuality) is caused to drive as determined in advance around the vehicle 1 in which the vehicle system according to the embodiment is mounted is performed, the training data t0 corresponding to the recognition result y0 and the training data t2 corresponding to the prediction information y2 can be acquired.

As illustrated in FIG. 12, in the present embodiment, global optimization of the recognition program 110, the OGM program 120, and the motion prediction program 130 is performed after the individual optimization. The global optimization of the three programs is performed by comparing the prediction information y2, which is the output of the motion prediction program 130 when the sensor input x is input into the recognition program 110, with the training data t2 corresponding to the prediction information y2.

The global optimization may be performed in the same manner as the individual optimization by finding the learning parameters of the recognition program 110 and the motion prediction program 130 (furthermore, the OGM program 120) that minimize the value of an error function in a machine learning model. However, while optimization specialized for the function of each of the recognition program 110 and the motion prediction program 130 is performed in the individual optimization, learning that achieves the optimal result of the three programs as a whole is implemented in the global optimization. Thus, a more appropriate result can be achieved than when merely the individual optimization is executed.

The global optimization uses a large number of parameters and has a high calculation load, compared to the individual optimization. Regarding such a point, the global optimization in the present embodiment is executed in a state where each of the recognition program 110 and the motion prediction program 130 is optimized by the individual optimization. Thus, the calculation load can be decreased further than when the global optimization is executed from the initial state. The global optimization considers the operation of all of the three programs. Thus, merely executing the global optimization may not reach the true optimal value that may be acquired in the individual optimization specialized for the function of each program (that is, the effect of optimization may not be sufficiently achieved). However, in the present embodiment, the individual optimization is executed first, and then, the global optimization is executed. Thus, the effect of optimization can be increased further than when merely the global optimization is performed.

As described thus far, the vehicle system according to the present embodiment executes the global optimization after executing the individual optimization and thus, can increase the effect of optimization to the maximum level while reducing the calculation load needed for optimization. Consequently, the prediction accuracy of the prediction information output from the motion prediction program 130 is increased, and various controls (for example, control of the engine 30 performed by the engine control program 150) that use the prediction information can be suitably executed.

The program optimization for the recognition program 110, the OGM program 120, and the motion prediction program 130 may be executed online after the vehicle system becomes available on the market (specifically, after the vehicle 1 starts being used). As described above, the program optimization can be executed when input data, output data, and training data for each program are provided. Thus, when a configuration that can accumulate traveling data of the vehicle 1 is employed, optimization can be performed using the accumulated actual traveling data of the vehicle 1, and the accuracy of the prediction information can be further increased. In such a case, since the individual optimization is executed before the vehicle system becomes available on the market, merely the global optimization may be a new execution.

In the vehicle system according to an aspect of the present disclosure, the third program may be configured to predict the future position of the object using a behavioral habit of the object that is determined from the time-series map data.

According to the aspect of the present disclosure, the future position of the object can be more accurately predicted using the behavioral habit (in other words, behavioral tendency) of the object.

In the vehicle system according to the aspect of the present disclosure, the third program may be configured to determine the behavioral habit of the object by determining which category of a plurality of preset habit categories a determination parameter calculated from the time-series map data corresponds to.

According to the aspect of the present disclosure, the future position of the object can be more accurately predicted in accordance with the habit category (for example, beginner driver, skilled driver, and impatient driver) that is determined by the determination parameter.

In the vehicle system according to the aspect of the present disclosure, the object may be another vehicle, and the habit categories may include general driver, skilled driver, beginner driver, impatient driver, autonomous vehicle, aggressive driver, vehicle of drunk driver, and emergency vehicle.

In the vehicle system according to the aspect of the present disclosure, the electronic control unit may be configured to set a traveling path of the vehicle based on the future position of the object predicted by executing the third program.

According to the aspect of the present disclosure, the vehicle can suitably travel while avoiding collision with or approach to the object present around the vehicle.

The vehicle system according to the aspect of the present disclosure may further include a sensor configured to detect the object present around the vehicle. The first program may be configured to compare a recognition result for the object with respect to input from the sensor with the first training data and optimize a learning parameter to approximate the recognition result to the first training data.

In the vehicle system according to the aspect of the present disclosure, the third program may be configured to compare prediction information for the time-series map data with the second training data and optimize the learning parameter to approximate the prediction information to the second training data.

In the vehicle system according to the aspect of the present disclosure, the first training data and the second training data may be acquired based on a result of simulation performed under a preset condition.

In the vehicle system according to the aspect of the present disclosure, the third program may include a recursive neural network and be configured to predict the future position of the object by deep learning.

The present disclosure is not limited to the embodiment and can be appropriately modified without violating the nature or spirit of the disclosure read from the claims and the entire specification. Such vehicle systems accompanying modifications also fall within the technical scope of the present disclosure.

What is claimed is:

1. A vehicle system comprising a sensor and an electronic control unit that is configured to execute a first program, a second program, and a third program,
   the first program being configured to recognize an object present around a vehicle,
   the second program being configured to store information related to the object recognized by the first program as time-series map data, and
   the third program being configured to predict a future position of the object based on the time-series map data stored by the second program;
   wherein the first program and the third program are configured to be
   (i) first, individually optimized based on first training data corresponding to output of the first program and second training data corresponding to output of the third program, the output of the first program being based on an input of the sensor and
   (ii) then, collectively optimized by comparing an output of the third program to a different second training data based on a second input of the sensor;
   wherein the third program is configured to predict the future position of the object using a behavioral habit of the object that is determined from the time-series map data,
   wherein the electronic control unit is configured to set a traveling path of the vehicle based on the future position of the object predicted by executing the third program.

2. The vehicle system according to claim 1, wherein the third program is configured to determine the behavioral habit of the object by determining which category of a plurality of preset habit categories a determination parameter calculated from the time-series map data corresponds to.

3. The vehicle system according to claim 2, wherein:
   the object is another vehicle; and
   the habit categories include general driver, skilled driver, beginner driver, impatient driver, autonomous vehicle, aggressive driver, vehicle of drunk driver, and emergency vehicle.

4. The vehicle system according to claim 1, wherein:
   the sensor is configured to detect the object present around the vehicle; and
   the first program is configured to compare a recognition result for the object with respect to input from the sensor with the first training data and optimize a learning parameter to approximate the recognition result to the first training data.

5. The vehicle system according to claim 4, wherein the third program is configured to compare prediction information for the time-series map data with the second training data and optimize the learning parameter to approximate the prediction information to the second training data.

6. The vehicle system according to claim 5, wherein the first training data and the second training data are acquired based on a result of simulation performed under a preset condition.

7. The vehicle system according to claim 1, wherein the third program includes a recursive neural network and is configured to predict the future position of the object by deep learning.

8. A non-transitory storage medium configured to execute a first program, a second program, and a third program,
   the first program being configured to recognize an object present around a vehicle,
   the second program being configured to store information related to the object recognized by the first program as time-series map data, and
   the third program being configured to predict a future position of the object based on the time-series map data stored by the second program;
   wherein the first program and the third program are configured to be
   (i) first, individually optimized based on first training data corresponding to output of the first program and second training data corresponding to output of the third program, the output of the first program being based on an input of a sensor and (ii) then, collectively optimized by comparing an output of the third program to a different second training data based on a second input of the sensor.

9. The non-transitory storage medium according to claim 8, wherein the third program is configured to predict the future position of the object using a behavioral habit of the object that is determined from the time-series map data.

10. The non-transitory storage medium according to claim 9, wherein the third program is configured to determine the behavioral habit of the object by determining which category of a plurality of preset habit categories a determination parameter calculated from the time-series map data corresponds to.

11. The non-transitory storage medium according to claim 10, wherein:
the object is another vehicle; and
the habit categories include general driver, skilled driver, beginner driver, impatient driver, autonomous vehicle, aggressive driver, vehicle of drunk driver, and emergency vehicle.

12. The non-transitory storage medium according to claim 8, wherein the storage medium is configured to set a traveling path of the vehicle based on the future position of the object predicted by executing the third program.

13. The non-transitory storage medium according to claim 8, wherein:
the sensor is configured to detect the object present around the vehicle; and
the first program is configured to compare a recognition result for the object with respect to input from the sensor with the first training data and optimize a learning parameter to approximate the recognition result to the first training data.

14. A method comprising:
recognizing, by a first program, an object present around a vehicle,
storing information, by a second program, related to the object recognized by the first program as time-series map data, and
predicting a future position of the object, by a third program, based on the time-series map data stored by the second program;
wherein the first program and the third program are configured to be
(i) first, individually optimized based on first training data corresponding to output of the first program and second training data corresponding to output of the third program, the output of the first program being based on an input of a sensor and
(ii) then, collectively optimized by comparing an output of the third program to a different second training data based on a second input of the sensor.

15. The method according to claim 14, further comprising predicting the future position of the object, but the third program, using a behavioral habit of the object that is determined from the time-series map data.

16. The method according to claim 15, further comprising determining the behavioral habit of the object, by the third program, by determining which category of a plurality of preset habit categories a determination parameter calculated from the time-series map data corresponds to.

17. The method according to claim 16, wherein:
the object is another vehicle; and
the habit categories include general driver, skilled driver, beginner driver, impatient driver, autonomous vehicle, aggressive driver, vehicle of drunk driver, and emergency vehicle.

18. The method according to claim 14, setting a traveling path of the vehicle based on the future position of the object predicted by executing the third program.

* * * * *